United States Patent
Freisler et al.

(10) Patent No.: US 11,505,151 B2
(45) Date of Patent: Nov. 22, 2022

(54) KNEE AIRBAG UNIT OF A VEHICLE OCCUPANT RESTRAINT SYSTEM OF A MOTOR VEHICLE

(71) Applicant: ZF AUTOMOTIVE GERMANY GMBH, Alfdorf (DE)

(72) Inventors: Werner Freisler, Schwäbisch Gmünd (DE); Daniel Elija, Schwäbisch Gmünd (DE)

(73) Assignee: ZF AUTOMOTIVE GERMANY GMBH, Alfdorf (DE)

( * ) Notice: Subject to any disclaimer, the term of this patent is extended or adjusted under 35 U.S.C. 154(b) by 68 days.

(21) Appl. No.: 16/753,059

(22) PCT Filed: Sep. 25, 2018

(86) PCT No.: PCT/EP2018/075896
§ 371 (c)(1),
(2) Date: Apr. 2, 2020

(87) PCT Pub. No.: WO2019/068506
PCT Pub. Date: Apr. 11, 2019

(65) Prior Publication Data
US 2020/0290546 A1 Sep. 17, 2020

(30) Foreign Application Priority Data
Oct. 6, 2017 (DE) .......................... 102017123193.5

(51) Int. Cl.
*B60R 21/206* (2011.01)
*B60R 21/215* (2011.01)
(Continued)

(52) U.S. Cl.
CPC .......... *B60R 21/206* (2013.01); *B60R 21/215* (2013.01); *B60R 21/2176* (2013.01);
(Continued)

(58) Field of Classification Search
CPC .......................... B60R 21/206; B60R 21/2176
See application file for complete search history.

(56) References Cited

U.S. PATENT DOCUMENTS

| 5,393,090 A | 2/1995 | Shepherd et al. |
| 5,564,732 A | 10/1996 | Bauer et al. |

(Continued)

FOREIGN PATENT DOCUMENTS

| DE | 102004008726 | 7/2005 | |
| WO | WO-2014191302 A1 * | 12/2014 | .......... B60R 21/206 |

(Continued)

*Primary Examiner* — Nicole T Verley
(74) *Attorney, Agent, or Firm* — Tarolli, Sundheim, Covell & Tummino LLP

(57) ABSTRACT

A knee airbag unit (10) of a vehicle occupant restraint system of a motor vehicle is described. The knee airbag unit (10) comprises an airbag module (12), which has a module holder (14), a gas generator (16) and a flexible, non-inherently rigid module housing (18) that at least partially surrounds the gas generator (16) and the airbag in the untriggered state, wherein the gas generator (16), the airbag and the flexible module housing (18) are fastened to the module holder (14). Also provided is a cover (20) forming a module covering and defining an outer side in the installed state of the knee airbag unit (10), which is connected to the airbag module (12). Furthermore, there is an edge-side means (26) securing the cover (20) against lowering, originating from the module holder (14).

15 Claims, 5 Drawing Sheets

(51) Int. Cl.
*B60R 21/217* (2011.01)
*B60R 21/231* (2011.01)
*B60R 21/264* (2006.01)
*B60R 21/00* (2006.01)

(52) U.S. Cl.
CPC .......... *B60R 21/231* (2013.01); *B60R 21/264* (2013.01); *B60R 2021/0051* (2013.01); *B60R 2021/23169* (2013.01)

(56) References Cited

U.S. PATENT DOCUMENTS

| | | | | |
|---|---|---|---|---|
| 7,566,074 | B2* | 7/2009 | Hawthorn | B60R 21/233 280/743.2 |
| 8,500,155 | B2* | 8/2013 | Enders | B60R 21/215 280/743.2 |
| 2006/0043700 | A1 | 3/2006 | Tsujimoto et al. | |
| 2007/0246920 | A1* | 10/2007 | Abele | B60R 21/206 280/743.2 |
| 2009/0033070 | A1 | 2/2009 | Dumbrique | |
| 2010/0244410 | A1* | 9/2010 | Chavez | B60R 21/217 280/728.2 |
| 2010/0244416 | A1* | 9/2010 | Mitsuo | B60R 21/2032 280/731 |
| 2015/0091276 | A1* | 4/2015 | Ando | B60R 21/206 280/728.3 |
| 2016/0096500 | A1* | 4/2016 | Lannen | B60R 21/216 280/728.2 |
| 2019/0031131 | A1 | 1/2019 | Elija et al. | |
| 2019/0054882 | A1* | 2/2019 | Son | B60R 21/206 |
| 2019/0202392 | A1* | 7/2019 | Ono | B60R 21/217 |
| 2020/0062206 | A1* | 2/2020 | Jacobson | B60R 21/2338 |
| 2020/0238938 | A1* | 7/2020 | Kang | B60R 21/206 |

FOREIGN PATENT DOCUMENTS

| | | |
|---|---|---|
| WO | 16075191 | 5/2016 |
| WO | 2016075191 | 5/2016 |

\* cited by examiner

KNEE AIRBAG UNIT OF A VEHICLE OCCUPANT RESTRAINT SYSTEM OF A MOTOR VEHICLE

RELATED APPLICATIONS

This application corresponds to PCT/EP2018/075896, filed Sep. 25, 2018, which claims the benefit of German Application No. 10 2017 123 193.5, filed Oct. 6, 2017.

BACKGROUND OF THE INVENTION

The invention relates to a knee airbag unit of a vehicle occupant restraint system of a motor vehicle, comprising an airbag module which has a module holder, a gas generator, an airbag and a flexible, non-inherently rigid module housing that at least partly surrounds the gas generator and the airbag in the untriggered state, wherein the gas generator, the airbag and the flexible module housing are fastened to the module holder.

Such flexible, non-inherently rigid module housings in many cases have replaced module housings of plastic or metal, in order to bring about weight advantages for the associated knee airbag unit.

Furthermore, the module holder is frequently used to support and to position the airbag when the latter is triggered. Appropriate functional surfaces are then provided on the module holder, so that said surfaces can absorb the forces produced during the triggering of the airbag.

SUMMARY OF THE INVENTION

The object of the invention is to improve such knee airbag units further. In particular, the intention is to devise a knee airbag unit which, in addition to a low weight, also has a long service life. In addition, it is intended to take into account the fact that the knee airbag unit is subjected to various forces during its service life, for example gravity, vibrations, for example during operation of the motor vehicle in which the knee airbag unit is installed, and temperature fluctuations.

The object is achieved by a knee airbag unit of the type mentioned at the beginning, in which a cover forming a module covering and defining an outer side in the installed state of the knee airbag unit is provided, which is connected to the airbag module, and in which there is an edge-side means securing the cover against lowering, originating from the module holder. The securing means therefore works as a position securing means. It can be direct, in that, for example, the cover is connected to the module holder. Alternatively, it can be indirect, in that, for example, the cover is connected to the module holder via an intermediate element. Such an intermediate element can be the module housing. The securing means can act on the cover as a whole or on parts or sections of the cover. Alternatively, the securing means can also manage without any connection of the cover to other elements of the airbag module. In every case, the securing means can also counteract deformation, in particular bending, of the cover. This thus ensures that the cover is kept reliably in its envisaged position, despite the forces, vibrations and temperatures acting thereon. As a result, the associated knee airbag unit functions reliably over a long service life. This applies to the knee airbag unit as a whole and in particular to an opening flap which is arranged on or in the cover, and which is opened when the airbag is triggered. As a result of the securing means according to the invention, this opening flap always opens smoothly and reliably. The safety of occupants of a vehicle which is equipped with such a knee airbag unit is increased as a result.

Preferably, the module housing is made of a fabric. The module housing preferably remains substantially in place even when the airbag is triggered. The module housing is light in weight. Furthermore, it has sufficient stability in order to keep the airbag in its untriggered state over a long service life.

The cover can have an elongated shape and end sections that are to be secured can be located on the opposite longitudinal edges. Furthermore, both end sections can be held. The end sections of covers with an elongated shape are particularly exposed with regard to the forces and temperatures acting and the vibrations that occur. In this respect, despite adverse environmental conditions, even elongated covers can be kept in their position reliably for years. As a result, the safety of the vehicle occupants is improved further.

According to an embodiment, the cover has a front wall and side edges originating therefrom, wherein the front wall has the outer side of the knee airbag unit facing the respective vehicle seat or the vehicle occupant in the installed state. The knee airbag unit can be arranged as a whole, for example in a dashboard panel. Subsequent steps for covering or concealing the knee airbag unit are not necessary. The knee airbag unit can thus be mounted simply.

Advantageously, the at least one securing means is formed by the module holder, and a section of the cover that is to be secured is connected to the module holder. The cover is therefore fastened to the module holder. As a result, no additional component is needed for securing. The module holder, which is already present, performs this task. The structure of the knee airbag unit is therefore simple. Furthermore, the knee airbag unit is comparatively light in weight, since it is produced from only a few parts.

The section of the cover that is to be secured can be connected to the module holder via connecting lugs arranged or molded on said cover. For this purpose, appropriate connecting protuberances or connecting projections which can be plugged into the connecting lugs can be formed on the module holder. The connecting lugs can also be connecting openings. The securing of the cover or the section of the cover that is to be secured can therefore be produced without tools and is substantially form-fitting. This thus provides reliable and stable securing.

One embodiment provides for at least one securing tongue and/or at least one opening to be arranged on the module holder, wherein the section of the cover that is to be secured is connected to the securing tongue and/or the opening, and/or the securing tongue extends from the rear side of the airbag module as far as a front wall and/or side walls of the cover and engages on and secures the same. The securing tongue can be straight or curved. In the curved variant, it can also engage behind the section of the cover that is to be secured. The form fit thus produced is simple and reliable.

The section of the cover that is to be secured is preferably hooked, clipped, screwed, riveted, pinned, clamped and/or adhesively bonded to the module holder. In addition, other suitable fastening methods can be used to connect the section of the cover that is to be secured to the module holder. Thus, the section that is to be secured is fastened reliably and durably to the module holder. Here, the fastening can be made optionally on one or more sides of the cover.

The module holder is preferably fastened to a component of the vehicle body, for example a cross-member. However, it is also possible to fasten the module holder to fixing points of the instrument panel that are provided for the purpose, in particular are reinforced. The module holder can also be an integral constituent part of the vehicle body or the instrument panel.

Advantageously, at least one securing means is formed by an extension or a recess on the cover, which interacts with a structure fixed to the vehicle, in particular an instrument panel. The cover is therefore fastened to the instrument panel or another structure fixed to the vehicle. As a result, the cover can be secured particularly reliably against the forces, temperatures and vibrations which occur.

Preferably, the securing means is formed at least on an edge region of the cover. It can also be formed in multiple edge regions. Thus, the cover is protected in the long term against displacement and/or deformation.

The cover can be hooked, clipped, screwed, riveted, pinned, clamped and/or adhesively bonded to the structure fixed to the vehicle. Other suitable methods for connecting the cover to the structure fixed to the vehicle are likewise possible. Thus, the cover or a section of the cover that is to be secured is thus reliably and durably fastened to the structure fixed to the vehicle.

In a development, the securing means has a cover stiffener provided on the cover. The cover is therefore inherently stiffened locally for securing purposes. Thus, known knee airbag units without a securing means can be converted by replacing the cover, without other components of the knee airbag unit being affected. This securing is likewise simple and reliable.

The cover stiffener can be a rib arrangement on the cover and/or an injection-molded, inserted and/or sewn-in stiffening component. It can therefore be produced simply and economically. At the same time, the cover stiffener is very durable.

In an alternative, the stiffening component is produced from a plastic which is stiffer than the material from which the cover is produced. Such a stiffening component can be produced simply. This results in economical and reliable securing.

The cover stiffener can be arranged on or in the vicinity of a material weakening and/or a hinge region of the cover. The material weakening generally acts as an intended fracture point when the airbag is triggered. The cover therefore tears off when the airbag is triggered. In the hinge region, the cover is then folded down relative to the remaining components of the knee airbag unit. The effect of the cover stiffener is that when the airbag is triggered, the cover particularly efficiently exposes the propagation space for the airbag. The latter can therefore open quickly and reliably.

Preferably, the module holder is a sheet metal part which has a substantially flat contact section, on the front side of which the airbag rests and on the rear side of which fastening devices for fastening to the vehicle project. The airbag can be supported on said contact section, in particular when it is triggered. A particularly lightweight knee airbag unit can thus be implemented.

BRIEF DESCRIPTION OF THE DRAWINGS

The invention will be explained below by using various exemplary embodiments, which are shown in the appended drawings, in which.

DESCRIPTION

Figure 1:
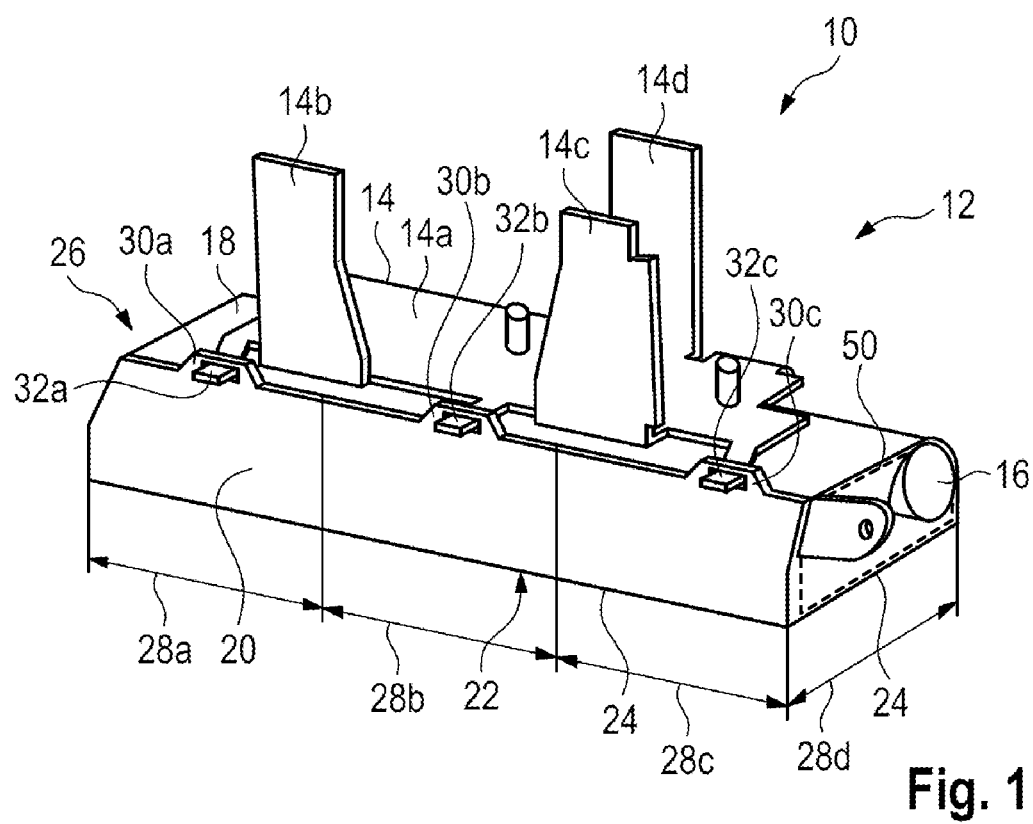
FIG. 1 shows a knee airbag unit according to the invention in a first embodiment in a perspective view.

A knee airbag unit 10 in FIG. 1 comprises an airbag module 12, which has a module holder 14, a gas generator 16, an airbag 50, and a flexible, non-inherently stiff module housing 18 that at least partly surrounds the airbag in the untriggered state.

The module holder 14 is implemented as a sheet metal part, which has a substantially flat contact section 14*a*, on the front side of which the airbag rests and on the rear side of which fastening devices 14*b*, 14*c*, 14*d* for fastening to the vehicle project. Said fastening devices 14*b*, 14*c*, 14*d* are illustrated only schematically.

The module housing 18 is made of a fabric in the embodiment illustrated.

The gas generator 16, the airbag and the module housing 18 are fastened to the module holder 14.

Furthermore, the knee airbag unit 10 comprises a cover 20.

The cover 20 forms a module covering which defines an outer side in the installed state of the knee airbag unit 10.

The cover 20 comprises a front wall 22 and side edges 24, which originate from the front wall 22. In an installed state, the front wall 22 is the visible outer side of the knee airbag unit 10. In the embodiment illustrated in FIG. 1, only two side edges 24 can be seen.

The cover 20 is connected to the airbag module 12.

Furthermore, there is an edge-side means 26 for securing the cover 20 against lowering and which originates from the module holder 14.

In the embodiment illustrated in FIG. 1, the securing means 26 is formed by the module holder 14.

To this end, the cover 20 comprises three sections 28*a*, 28*b*, 28*c* that are to be secured, which are each connected to the module holder 14. A connecting lug 30*a*, 30*b*, 30*c* is molded on each of the sections 28*a*, 28*b*, 28*c* that are to be secured. Respectively assigned securing tongues 32*a*, 32*b*, 32*c* are arranged on the module holder 14.

The sections 28*a*, 28*b*, 28*c* of the cover 20 that are to be secured are thus connected to the securing tongues 32*a*, 32*b*, 32*c* via the connecting lugs 30*a*, 30*b*, 30*c*.

The securing tongues 32*a*, 32*b*, 32*c* extend from the rear side of the airbag module 12 as far as a side wall of the cover 20.

As an alternative to the engagement of the securing tongues 32*a*, 32*b*, 32*c* in the connecting lugs 30*a*, 30*b*, 30*c*, each of the sections 28*a*-28*c* that are to be secured can also be hooked, screwed, riveted, pinned, clamped and/or adhesively bonded to the module holder 14.

Figure 2:
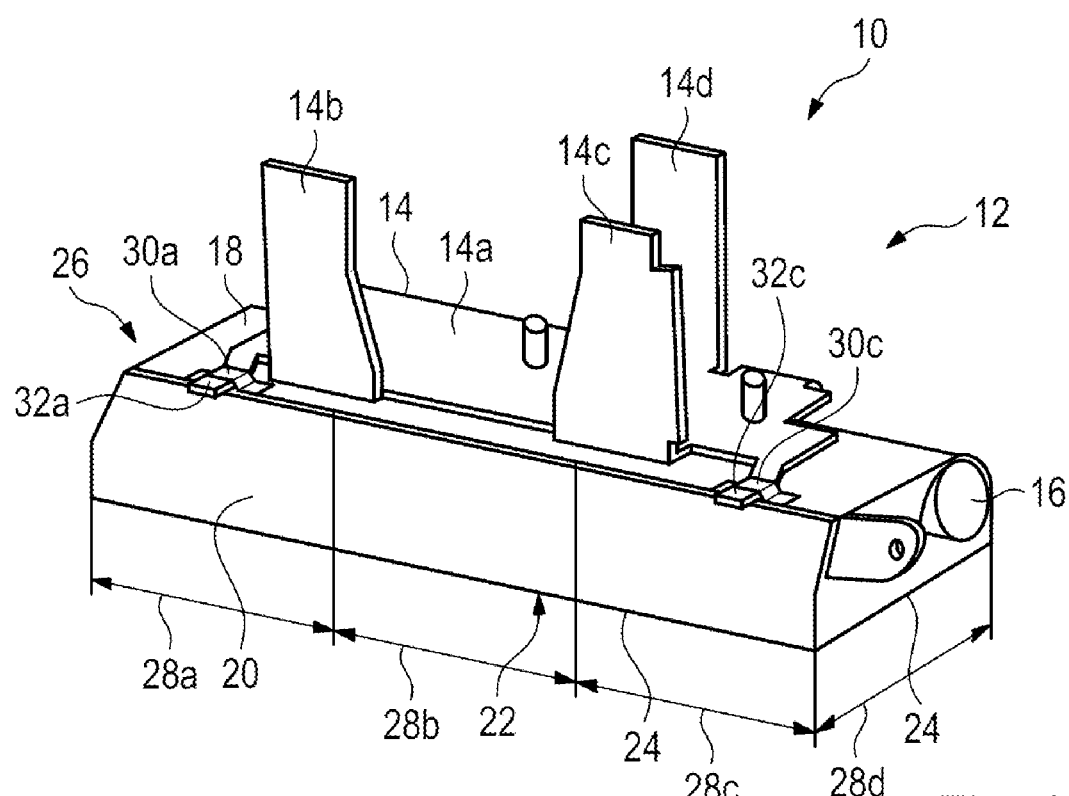
FIG. 2 shows a knee airbag unit according to the invention in a second embodiment in a perspective view.

FIG. 2 illustrates a second embodiment of the knee airbag unit 10. In the following, only the differences from the embodiment shown in FIG. 1 will be discussed.

In the second embodiment, the connecting lugs 30a, 30c are not attached to the cover 20 but to the module housing 18.

The connecting lugs 30a, 30b again interact with the securing tongues 32a, 32c, which are plugged into the connecting lugs 30a, 30c. Thus, the sections 28a, 28c that are to be secured are connected to the module holder 14.

In order to make it clear that the number of sections 28a-28c that are to be secured and the corresponding number of connecting lugs 30a-30c and the associated securing tongues 32a-32c can be chosen freely, depending on the application, only the two connecting lugs 30a, 30b can be seen in FIG. 2. The section 28b that is to be secured is therefore not secured in this embodiment.

Figure 3:
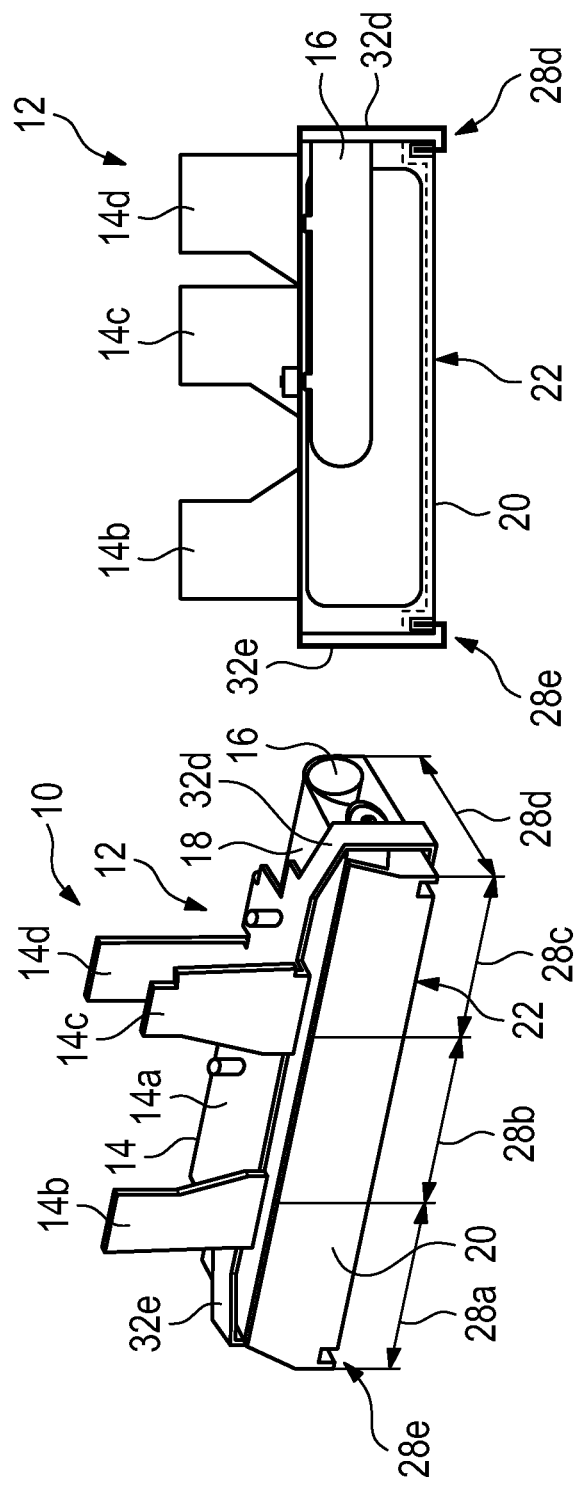
FIG. 3 shows a knee airbag unit according to the invention in a third embodiment in a perspective and in a sectioned view.

FIG. 3 reveals a further embodiment, for which only the differences from the two aforementioned embodiments are to be explained.

Here, the cover 20 has an elongated shape, as in the aforementioned embodiments.

In the embodiment shown in FIG. 3, the sections 28d, 28e that are to be secured are end sections, which are located at opposite ends of the longitudinal extent of the cover 20. These ends are also designated as longitudinal edges.

The sections 28d, 28e that are to be secured do not comprise connecting lugs. Instead, stiffeners into which the respectively associated securing tongues 32d, 32e of the module holder 14 engage are arranged on said sections 28d, 28e.

The two sections 28d, 28e that are to be secured and are formed as end sections are therefore held by means of the securing tongues 32d, 32e.

The securing tongues 32d, 32e extend from the rear side of the airbag module 12, in particular from the contact section 14a, as far as the front wall 22 of the cover 20.

They engage on the front wall 22 and secure the latter.

Figure 4:
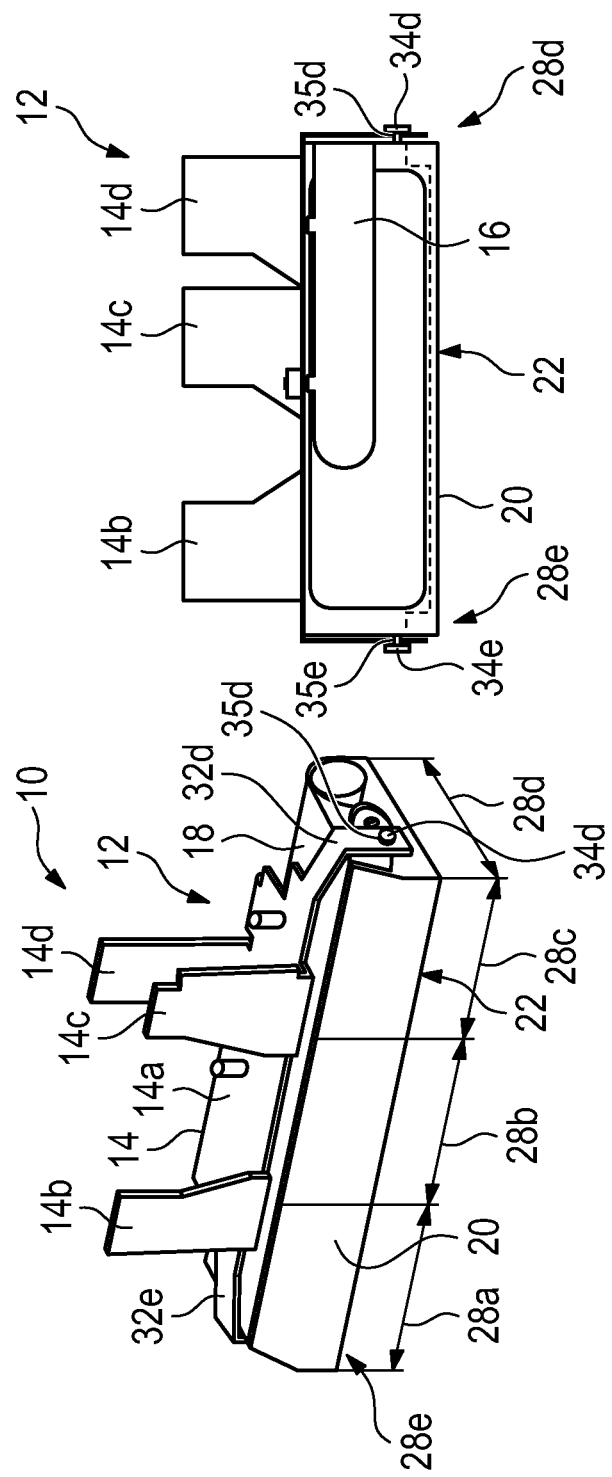
FIG. 4 shows a knee airbag unit according to the invention in a fourth embodiment in a perspective and in a sectioned view.

FIG. 4 shows a further embodiment of the knee airbag unit 10 which, in particular, will be explained as distinct from the embodiment shown in FIG. 3.

Here, the sections 28d, 28e of the cover 20 that are to be secured are again connected to the module holder 14.

The securing tongues 32d, 32e are, however, implemented differently than in the embodiment according to FIG. 3. The sections 28d, 28e that are to be secured are connected to the module holder 14 by means of respectively associated securing pins 34d, 34e, which each engage in an opening 35d, 35e. The openings 35d, 35e, are made in the securing tongues 32d, 32e.

The securing tongues 32d, 32e extend from the rear side of the airbag module 12, in particular from the contact section 14a, as far as the side walls of the cover 20.

The securing tongues 32d, 32e engage on the side walls and secure the same.

Figure 5:
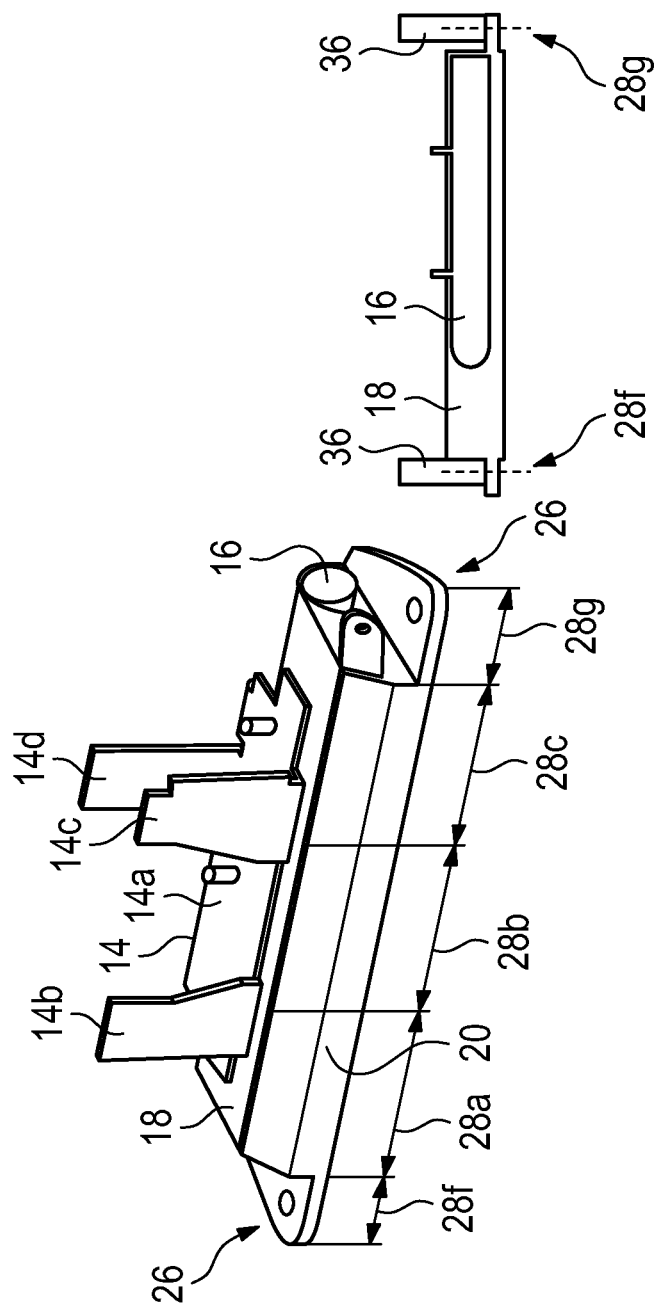
FIG. 5 shows a knee airbag unit according to the invention in a fifth embodiment in a perspective and in a sectioned view.

An additional embodiment is shown in FIG. 5. As distinct from the aforementioned embodiments, here the means 26 for securing the cover 20 against lowering is formed by a connection of the cover 20 to a structure 36 fixed to the vehicle. The structure 36 fixed to the vehicle can in particular be an instrument panel. Once more, only the differences from the aforementioned embodiments will be explained.

In the embodiment according to FIG. 5, the sections 28f, 28g of the cover 20 that are to be secured are implemented as edge sections.

The securing means 26 is therefore formed on an edge region of the cover 20.

Furthermore, the sections 28f, 28g that are to be secured are formed as extensions of the cover 20. This becomes clear in particular if the sections 28a-28c are considered which, in the embodiment according to FIG. 5, are not secured and are illustrated only for clarification.

The securing means 26 is therefore formed by an extension on the cover 20.

In the embodiment illustrated, the sections 28f, 28g that are to be secured are screwed to the structure 36 fixed to the vehicle. Alternatively, these could also be hooked, clipped, riveted, pinned, clamped and/or adhesively bonded to the structure 36 fixed to the vehicle.

In particular, the sections 28f, 28g that are to be secured and that each form an extension could also form a form fit with the structure 36 fixed to the vehicle.

Figure 6:
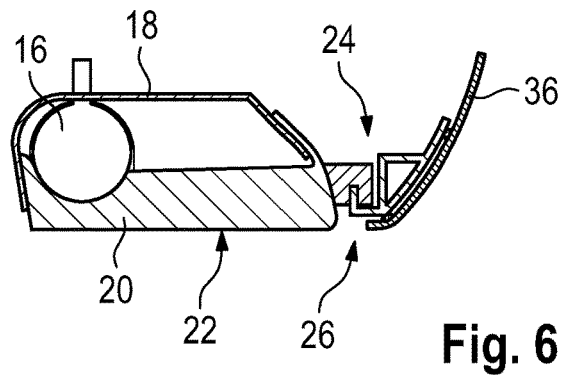
FIG. 6 shows a knee airbag unit according to the invention in a sixth embodiment in a sectional illustration.

FIG. 6 shows a further embodiment, in which the securing means 26 is likewise formed by the cover 20 being connected to the structure 36 fixed to the vehicle.

The structure 36 fixed to the vehicle is hooked to the cover 20, the structure 36 fixed to the vehicle engaging in a recess on the cover 20.

The securing means 26 is therefore formed by a recess on the cover 20.

Thus, the structure 36 fixed to the vehicle and the cover 20 form a form fit.

Figure 7:
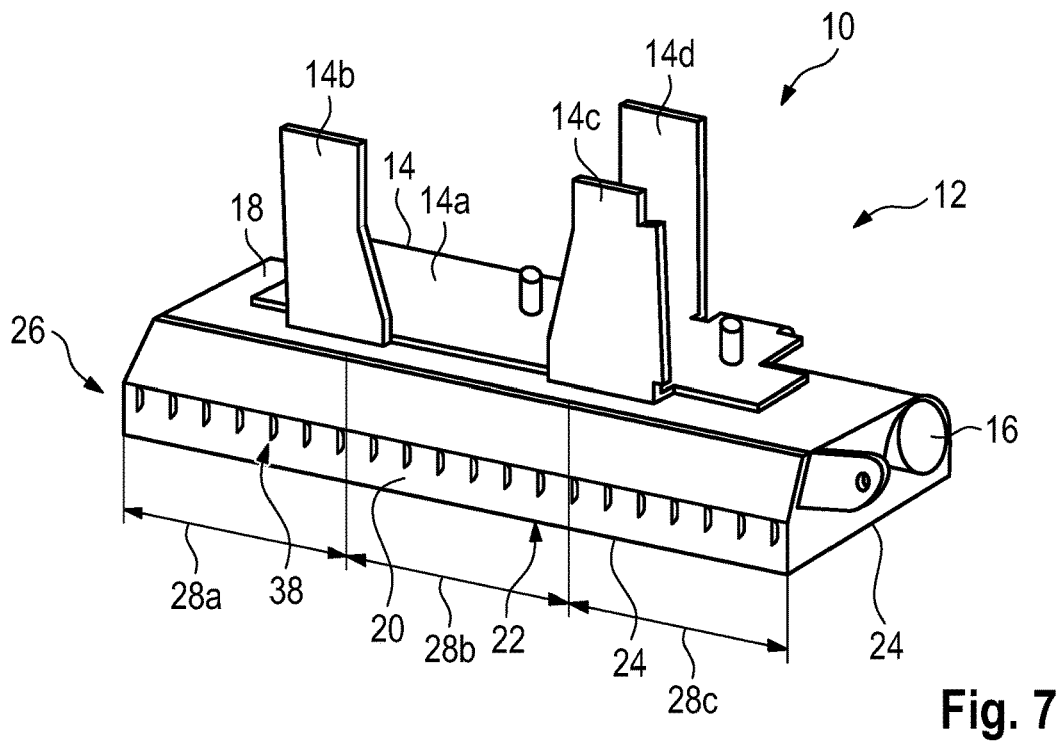
FIG. 7 shows a knee airbag unit according to the invention in a seventh embodiment in a perspective view.
Figure 8:
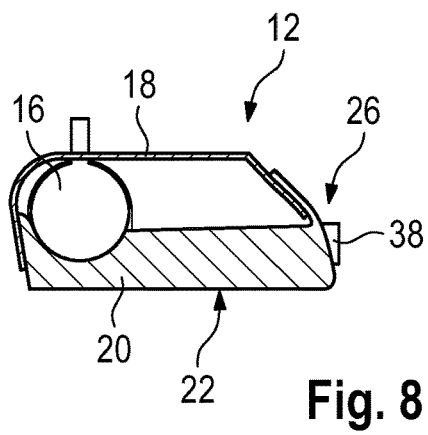
FIG. 8 shows a detail of the knee airbag unit from FIG. 7 in a sectional illustration.
Figure 9:
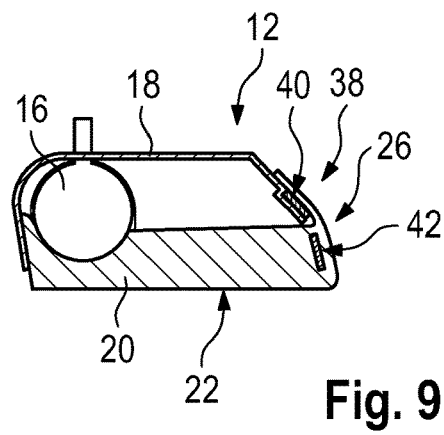
FIG. 9 shows a knee airbag unit according to the invention in an eighth embodiment in a sectional view.

Further embodiments of the knee airbag unit 10 are illustrated in FIGS. 7-9. In the embodiments according to these figures, the securing means 26 comprises a cover stiffener 38 provided on the cover 20.

In the examples of FIGS. 8 and 9, the cover stiffener 38 is arranged in the region of a material weakening, which tears open when the airbag is triggered.

Furthermore, in the embodiment according to FIG. 8, the cover stiffener 38 is implemented as a rib arrangement on the cover 20.

In the embodiment according to FIG. 9, the cover stiffener 38 is formed from injection-molded stiffening components 40, 42.

These are produced from a plastic which is stiffer than the material from which the cover 20 is produced.

The invention claimed is:

1. A knee airbag unit of a vehicle occupant restraint system of a motor vehicle, comprising:
   an airbag module comprising a module holder, a gas generator, an airbag, and a fabric module housing that at least partly surrounds the gas generator and the airbag in the untriggered state, the gas generator, the airbag, and the fabric module housing being fastened to the module holder; and
   a cover connected to the airbag module and forming a module covering that defines an outer surface of the knee airbag unit in an installed state, the cover being configured to be sufficiently rigid to support the fabric module housing against negative effects that gravity and vibration can place on the module housing over time;
   wherein the cover comprises a front wall having end sections, wherein the front wall comprises an outer side forming an outer side of the knee airbag unit that faces the vehicle occupant in the installed state of the knee airbag unit, and an opposite inner side that engages and supports the module housing;
   wherein at least one of the end sections is configured to be secured to the module holder to support the cover against lowering so that the cover can thereby support the module housing, the cover being configured to open in response to airbag inflation, the fabric of the airbag module being configured to tear or otherwise rupture to allow the airbag to deploy.

2. The knee airbag unit according to claim 1, wherein the end sections comprise longitudinal edges of the cover.

3. The knee airbag unit according to claim 1, wherein the end section configured to be secured to the module holder comprises a series of connecting lugs arranged along the end section of the cover and configured to be connected to the module holder.

4. The knee airbag unit according to claim 1, wherein the module holder comprises at least one securing tongue and/or at least one opening configured to receive and support the at least one end section of the cover.

5. The knee airbag unit according to claim 1, wherein the module holder comprises a securing tongue that is configured to be received in a connecting lug of the cover to secure the cover to the module holder.

6. The knee airbag unit according to claim 1, wherein the cover is configured to be at least one of hooked, clipped, screwed, riveted, pinned, clamped, and adhesively bonded to the module holder.

7. The knee airbag unit according to claim 1, wherein the module holder is a sheet metal part, which has a substantially flat contact section, on the front side of which the module housing rests and on the rear side of which the fastening devices for fastening to the vehicle project.

8. The knee airbag unit according to claim 1, wherein the module housing engages a contact section of the module holder on an upper side and contacts the cover on a lower side, wherein the contact section supports the knee airbag when triggered, the airbag opening the cover and the module housing in response thereto.

9. The knee airbag unit according to claim 1, wherein at least one securing means is formed by an extension or a recess on the cover, which interacts with an instrumental panel.

10. The knee airbag unit according to claim 9, wherein the securing means is formed at least on an edge region of the cover.

11. The knee airbag unit according to claim 9, wherein the cover is hooked, clipped, screwed, riveted, pinned, clamped and/or adhesively bonded to the structure fixed to the vehicle.

12. The knee airbag unit according to claim 9, wherein the securing means has a cover stiffener provided on the cover.

13. The knee airbag unit according to claim 12, wherein the cover stiffener is a rib arrangement on the cover and/or an injection-molded, inserted and/or sewn-in stiffening component.

14. The knee airbag unit according to claim 13, wherein the stiffening component is produced from a plastic which is stiffer than the material from which the cover is produced.

15. The knee airbag unit according to claim 12, wherein the cover stiffener is arranged on or in the vicinity of a material weakening and/or a hinge region of the cover.

* * * * *